(12) United States Patent
Braun et al.

(10) Patent No.: US 7,447,514 B2
(45) Date of Patent: Nov. 4, 2008

(54) METHOD OF TRANSMITTING DATA IN A WIRELESS CELLULAR TELECOMMUNICATION NETWORK

(75) Inventors: Volker Braun, Stuttgart (DE); Dietrich Zeller, Sindelfingen (DE)

(73) Assignee: ALCATEL, Paris (FR)

( * ) Notice: Subject to any disclaimer, the term of this patent is extended or adjusted under 35 U.S.C. 154(b) by 334 days.

(21) Appl. No.: 10/781,627

(22) Filed: Feb. 20, 2004

(65) Prior Publication Data

US 2004/0198370 A1 Oct. 7, 2004

(30) Foreign Application Priority Data

Apr. 7, 2003 (EP) .................................. 03290854

(51) Int. Cl.
*H04Q 7/20* (2006.01)
(52) U.S. Cl. ...................... 455/522; 455/69; 455/127.1; 455/13.4; 455/450; 455/453
(58) Field of Classification Search ................. 455/522, 455/69, 127.1
See application file for complete search history.

(56) References Cited

U.S. PATENT DOCUMENTS

2002/0094833 A1* 7/2002 Lieshout et al. ............. 455/522

FOREIGN PATENT DOCUMENTS

| EP | 1 061 680 A1 | 12/2000 |
|---|---|---|
| EP | 1 237 296 A2 | 9/2002 |
| EP | 1237296 A2 * | 9/2002 |
| WO | WO 01/48929 A2 | 7/2001 |
| WO | WO 02/056498 A2 | 7/2002 |

OTHER PUBLICATIONS

X. Qiu et al, "Some performance results for the downlink shared channel in WCDMA", ICC 2002. 2002 IEEE International Conference on Communications. Conference Proceedings, NY, NY, Apr. 28-May 2, 2002, IEEE International Conference on Communications, NY, NY, vol. 1 of 5, Apr. 28, 2002. pp. 376-380, XP010589520.

Z. Naor et al, "Announced dynamic access probability protocol for next generation wireless networks", Computer Networks, Elsevier Science Publishers, B.V. Amsterdam, NL. vol. 41, No. 4, Mar. 15, 2003, pp. 527-544, XP004404985.

* cited by examiner

*Primary Examiner*—Charles N Appiah
*Assistant Examiner*—Randy Peaches
(74) *Attorney, Agent, or Firm*—Sughrue Mion, PLLC

(57) ABSTRACT

The present invention relates to a method of transmitting data over first and second channels, the first channels having a predefined grade of service and the second channels having a variable grade of service, the method comprising: determining a load of a transmit power amplifier, determining a share of the load which is due to the transmission over the first channels, determining a difference between a maximum load and the share, controlling the transmission over the second channels on the basis of the difference.

8 Claims, 2 Drawing Sheets

METHOD OF TRANSMITTING DATA IN A WIRELESS CELLULAR TELECOMMUNICATION NETWORK

TECHNICAL FIELD

The present invention generally relates to telecommunications, and more particularly to the control of data transmission in a wireless cellular telecommunication network. The invention is based on a priority application EP 03 290 854.3 which is hereby incorporated by reference.

BACKGROUND OF THE INVENTION

The demand for data communication services has exploded with the acceptance and widespread use of the Internet. While data communications have historically been serviced via wired connections, wireless users are now demanding that their wireless units also support data communications. Many wireless subscribers now expect to be able to "surf" the Internet, access their email, and perform other data communication activities using their cellular phones, wireless personal data assistants, wirelessly linked notebook computers, and/or other wireless devices.

Significant performance issues exist when using a wireless network to service data communications. Wireless networks were initially designed to service the well-defined requirements of voice communications. Generally speaking, voice communications require a sustained bandwidth with minimum signal-to-noise ratio (SNR) and continuity requirements. Data communications, on the other hand, have very different performance requirements. Data communications are typically bursty, discontinuous, and may require a relatively high bandwidth during their active portions.

The wireless network infrastructure must support both low bit rate voice communications and the varying rate data communications. More particularly, the network infrastructure must transmit low bit rate, delay sensitive voice communications together with high data rate, delay tolerant rate data communications.

It is therefore desirable to provide a communication system that is capable of carrying both delay sensitive lower data rate voice communications and delay tolerant higher data rate data communications with minimal waste of spectral capacity. Further, it is also desirable to provide a communication system that also services bursty data traffic for a plurality of data users without wasting allocated spectrum.

One example of such a communication system is the Universal Mobile Telecommunications System (UTMS) Terrestrial Radio Access Network (UTRAN). The UTRAN is a third generation system which in some respects builds upon the radio access technology known as Global System for Mobile communications (GSM). UTRAN is a wideband code division multiple access (W-CDMA) system.

A goal of the Third Generation Partnership Project (3GPP) is to evolve further the UTRAN and GSM-based radio access network technologies. Of particular interest here is the support of variable transmission rate services in the third generation mobile radio communications system for both real time and non-real time delay tolerant services. Because users share the same radio resources, the radio access network must carefully allocate resources to individual user equipment (UE) connections based on quality of service requirements, such as variable rate services, and on the availability of radio resources.

For example, in a multimedia session, one bearer may carry a speech connection, another bearer carries a video connection, and a third bearer may carry a packet data connection. Connections are mapped by the UTRAN onto physical transport channels.

Between the UE and the UTRAN, a connection may be mapped to one or more dedicated transport channels (DCHs) or to a common transport channel such as a random access common channel (RACH), a forward access common channel (FACH), a common packet channel (CPCH), a downlink shared channel (DSCH), and a high speed-downlink shared channel (HS-DSCH).

Real time connections are mapped to dedicated channels. On a dedicated channel, resources may be guaranteed to provide a particular service, such as a minimum transmission rate for voice communications. For more information on transport channels, reference should be made to the UMTS 3GPP Specs as follows: 3G TS 25.211, V3.5.0; 3G TS 25.221, V3.5.0; and 3G TS 25.331, V3.5.0, 3G TR 25.848, V0.6.0, 3GPP TR 25.858 V1.0.4, 3GPP TR 25.950 V4.0.0 the disclosures of which are incorporated herein by reference.

To provide effective multimedia capabilities in UMTS, the High-Speed Downlink Packet Access (HSDPA) scheme is being developed which facilitates transfer of packet data to a mobile station at up to e.g. 4 Mbps.

The concept of HSDPA has been standardized in 3GPP for UMTS (cf. 3GP TR 25.858, V1.0.4 January 2002). It considers enhancements that can be applied to UTRA to provide very high-speed downlink packet access by means of a high-speed downlink shared channel (HS-DSCH).

For the basic structure of HS-DSCH two architectures have been considered i.e. an RNC-based architecture consistent with R99 architecture and a node B-based architecture for scheduling. Moving the scheduling to the nodes B enables a more efficient implementation of scheduling by allowing the scheduler to work with the most recent channel information. The scheduler can adapt the modulation to better match the current channel conditions and fading environment. Moreover, the scheduler can exploit the multi-user diversity by scheduling only those users in constructive fades.

In CDMA systems, different signals are transmitted simultaneously within the same frequency band, i.e. the transmit power amplifiers (TPA) have to cope with an input signal obtained by adding a large number of transmit signals for different users and traffic classes. In the multi-carrier case, this input signal is given by the sum of the input signals for several frequency bands. The range of this multi-carrier sum signal must be within the linear range of the TPA input. Also the average power of the multi-carrier sum signal must be a certain amount below a maximum allowed power threshold, to allow for short peak power values to be in the linear range.

In other words, the load put on the TPA has to be monitored and overload situations (i.e. situations where the above conditions are not met) have to be controlled, such that the stability of the network and QoS for user of the network is maintained.

It is therefore an aim of the present invention to provide a method of transmitting of data which prevents overload situations of the transmit power amplifiers and which makes efficient usage of the available transmit power.

SUMMARY OF THE INVENTION

The present invention provides for a method of transmitting data over first and second channels. The first channels have a predefined grade of service which is also referred to as quality of service (QoS). This predefined grade of service is required for real time connections, such as voice communications. The second channels have a variable grade of service such as for the transmission of bursty data traffic. Such a variable grade of service is also referred to a 'best effort' traffic'.

The data signals of the first and second channels are added and determine the load of the transmit power amplifier which is used for sending of the data. A share of this total load is due to the transmission of data over the first channels. The difference between this load and the maximum total load of the transmit power amplifier can be used for the data transmission on the second channels. As the grade of service can vary on the second channels the data transmission over the second channels is controlled on the basis of this difference in order to make maximum usage of the available total power without surpassing the allowable power limit.

In accordance with a preferred embodiment of the invention the first channels are dedicated transport channels and the second channels are high speed-downlink shared channels of a CDMA system, such as wide band CDMA, in particular UMTS.

In accordance with a further preferred embodiment of the invention the control is performed by a scheduler for the second channels which operates independently from a scheduler for the first channels. For example the scheduler for the second channels is implemented in the MAC-hs of the node-B, whereas the scheduler for the first channels is implemented in the MAC-d of the radio network controller (RNC).

One of the advantages of the present invention is that all the carriers of multiple cells of a multi-carrier transmit power amplifier (TPA) are processed jointly. This integrative approach enables to make maximum usage of the available system resources. For example, if there is a relatively low traffic volume on one carrier, another carrier is allowed to transmit additional best-effort data packets as the total power limit is not exceeded.

BRIEF DESCRIPTION OF THE DRAWINGS

In the following preferred embodiments of the invention will be described in greater detail by making reference to the drawings in which.

DETAILED DESCRIPTION OF PREFERRED EMBODIMENTS

Figure 1:
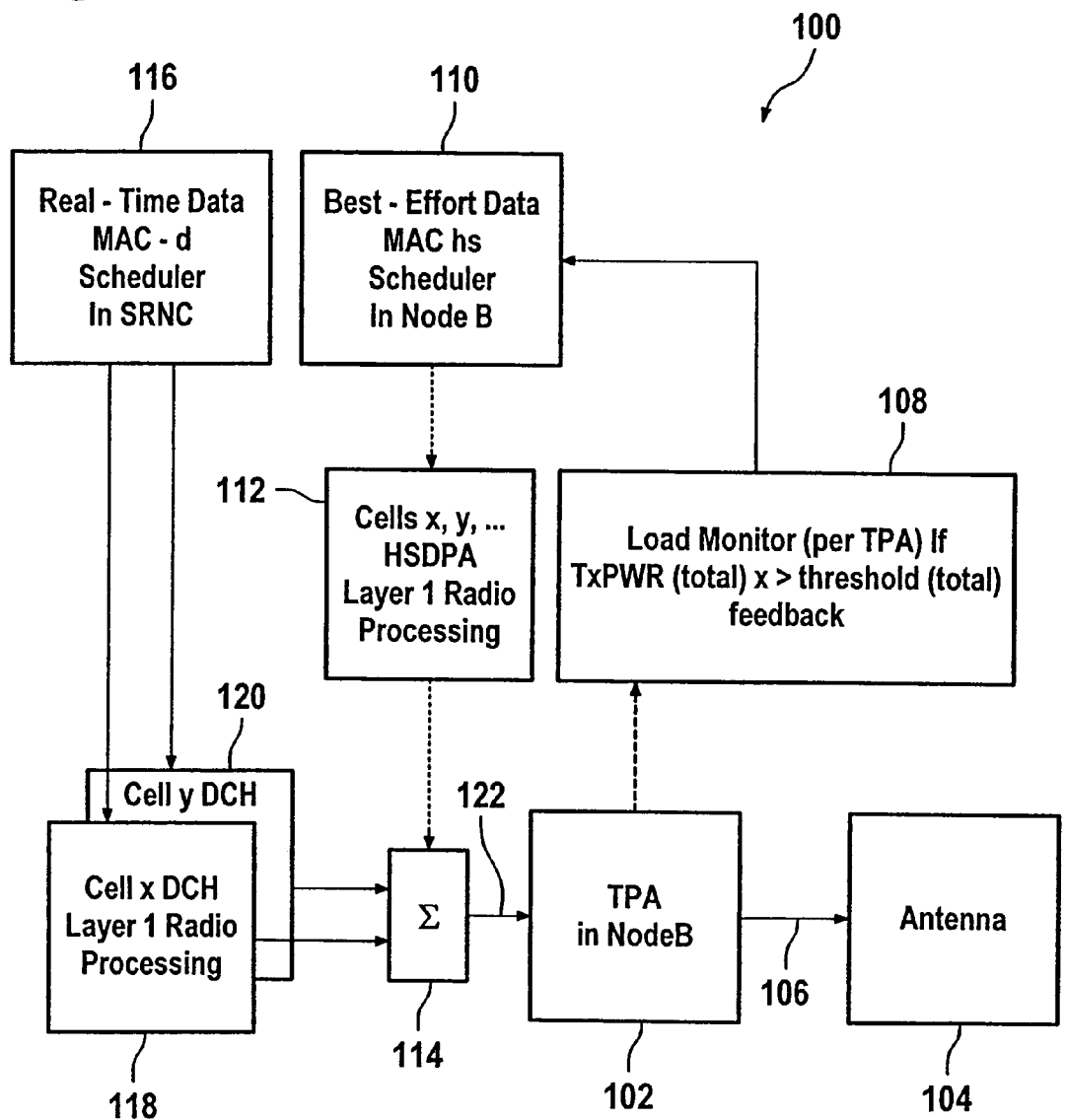
FIG. 1 is a block diagram of a preferred embodiment of a telecommunication system of the invention.

FIG. 1 shows a telecommunication system 100. In the preferred embodiment of FIG. 1 telecommunication system 100 is a CDMA system, such as a wide band CDMA system e.g. a UMTS-type system.

Each node-B of telecommunication system 100 has a transmit power amplifier (TPA) 102. TPA 102 is coupled to one or more antennas 104 for the transmission of a multi-carrier CDMA data signal 106.

The actual load of the TPA 102 is determined by load monitor 108. Further the node-B has a scheduler 110 which is implemented in the MAC-hs layer. MAC-hs layer provides the data packets to be transmitted to radio processing module 112 and scheduler 110 provides control information for the transmission of the data packets, such as data rates and modulation and/or coding schemes, to HSDPA layer 1 radio processing module 112. Radio processing module 112 provides the data to be transmitted via a high speed-downlink shared channel (HS-DSCH) to adder 114.

Further telecommunication system 100 has a radio network controller (RNC) for the node-B. The RNC has scheduler 116 for data to be transmitted via dedicated transport channels (DCHs). This is done for multiple cells x, y, ... which are covered by the same TPA 102. Scheduler 116 outputs control information for the layer 1 radio processing modules 118, 120, ... of the respective cells x, y, ... The resulting data to be transmitted over the DCHs is also inputted into adder 114 which provides the combined signal 122; this combined signal 122 is inputted into TPA 102 for power amplification and transmission over the one or more antennas 104.

TPA 102 has a power limit which should not be exceeded in order to ensure that TPA 102 operates within its linear range and further to prevent damage from TPA 102. Alternatively the power limit is not determined by the TPA 102 but e.g. is a result of the cell planning.

In operation load monitor 108 determines the actual loading condition of TPA 102. This can be done by measuring the output power of TPA 102 or by analysing signal 122 in order to determine the transmit power which is required for transmission of the signal. When the total transmission power Tx exceeds an allowed threshold level for the total transmission power load monitor 108 provides a feedback signal to scheduler 110. In response scheduler 110 reduces the data transmission over HS-DSCH until the feedback signal of load monitor 108 disappears. This way the grade of service provided by the HS-DSCH is temporarily degraded while the predefined grade of service on the DCHs is still maintained.

Alternatively load monitor 108 permanently reports the actual load of TPA 102 to scheduler 110. As scheduler 110 is aware of the previously scheduled data transmission over HS-DSCH it can determine the share of the total actual load which is due to the DCHs. Alternatively dedicated measurement means are provided for measuring the loads of the DCHs and/or HS-DSCHs. The difference between the share of the load which is due to the transmission over DCHs and the allowed maximum power of TPA 102 provides the power which is available for the HS-DSCH type transmission. Scheduler 110 performs the scheduling of the data transmission over HS-DSCH on the basis of this difference in order to make maximum utilisation of the transmission power resources which are not required for the DCHs communication.

Figure 2:
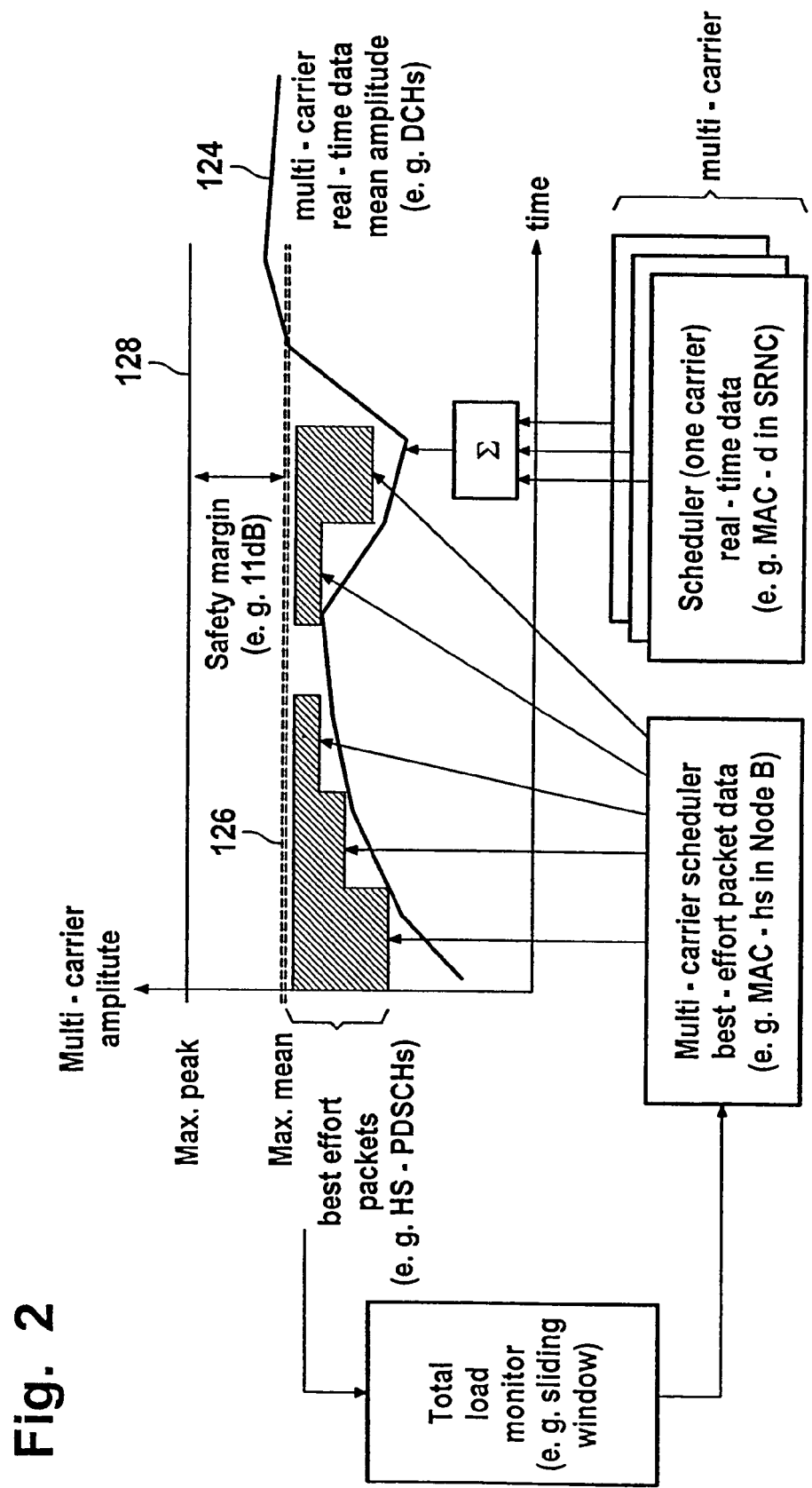
FIG. 2 is illustrative of controlling the data transmission over channels having a variable grade of service.

This control methodology is also illustrated in FIG. 2. FIG. 2 shows the actual power of TPA 102 over time. Solid line 124 in the diagram illustrates the multi-carrier real-time data mean amplitude due to the data transmission over the DCHs. In other words line 124 shows the total power which is required of the total available power (maximum mean power) for the transmission of data over the DCHs with a predefined grade of service.

The gap between line 124 and maximum mean power indicated by dashed line 126 is filled by the transmission of best-effort data packets over HS-DSCH by scheduler 110 (cf. FIG. 1). This way TPA 102 constantly operates at about its allowed maximum mean power level with a safety margin to its maximum peak power 128.

One of the advantages of this control methodology is that radio overload control can be performed without reducing the link quality for real-time traffic. Instead—the volume of best-effort traffic controlled i.e. by reducing the throughput of the best-effort traffic in case of an overload situation.

Another advantage is that this solution does not interfere with the power control mechanism which are typically used for real-time traffic in UMTS. On the contrary, the radio overload control of the invention can be combined with such prior art power control mechanisms. Such prior art power or radio overload control mechanism can be additionally used by the Node B for the cells x, y, . . .

Another advantage is that the scheduling instance for the non-real-time traffic is located in the MAC-hs of the node-B. This proximity to the TPA 102 enables to perform fast radio overload control, e.g. slot-by-slot or subframe-by-subframe.

Another advantage is that the HSDPA coverage radius can be extended due to the improved usage of the available system resources. This is particularly advantageous for providing coverage for so called hot spots.

List of Reference Numerals 100 telecommunication system
102 transmit power amplifier (TPA)
104 antenna
106 signal
108 load monitor
110 scheduler
112 radio processing module
114 adder
116 scheduler
118 radio processing module
120 radio processing module
122 signal
124 line
126 line
128 maximum peak power

The invention claimed is:

1. A method of transmitting data over first and second channels, the first channels having a predefined grade of service and the second channels having a variable grade of service, the method comprising:
    determining an actual load of a transmit power amplifier,
    determining a share of the load which is due to the transmission over the second channels,
    determining a share of the load which is due to the transmission over the first channels by subtracting the share of the load which is due to the transmission over the second channels from the actual load of the transmit power amplifier,
    determining a difference between a maximum load and the share of the load which is due to the transmission over the first channels, and
    controlling the transmission over the second channels on the basis of the difference.

2. The method of claim 1, whereby the first channels are dedicated channels and the second channels are shared channels.

3. The method of claim 1, whereby the load is determined by means of a moving average of the load being required to transmit the data over the first and second channels by means of the transmit power amplifier.

4. The method of claim 1, the maximum load being a mean power amplitude, whereby the mean power amplitude is a safety margin below a maximum peak power amplitude.

5. The method of claim 1, whereby the control is performed by a scheduler for the second channels.

6. The method of claim 1, the transmission of data over the first channels being scheduled by a scheduler for the first channels independently from the scheduler for the second channels.

7. A base station for transmitting of data over first and second channels, the first channels having a predefined grade of service and the second channels having a variable grade of service, the base station comprising:
    means for determining an actual load of a transmit power amplifier,
    means for determining a share of the load which is due to the transmission over the second channels,
    means for determining a share of the load which is due to the transmission over the first channels by subtracting the share of the load which is due to the transmission over the second channels from the actual load of the transmit power amplifier,
    means for determining a difference between a maximum load and a share of the load due to the transmission over the first channel;
    means for determining a difference between a maximum load and the share, and
    means for controlling the transmission over the second channels on the basis of the difference.

8. A wireless cellular telecommunication network for transmitting of data over first and second channels, the first channels having a predefined grade of service and the second channels having a variable grade of service, the telecommunication network comprising:
    means for determining an actual load of a transmit power amplifier,
    means for determining a share of the load which is due to the transmission over the second channels,
    means for determining a share of the load which is due to the transmission over the first channels by subtracting the share of the load which is due to the transmission over the second channels from the actual load of the transmit power amplifier,
    means for determining a difference between a maximum load and a share of the load due to the transmission over the first channel;
    means for determining a difference between a maximum load and the share,
    means for controlling the transmission over the second channels on the basis of the difference.

* * * * *